UNITED STATES PATENT OFFICE.

WALTER ERNEST WADMAN, OF BAYONNE, NEW JERSEY, ASSIGNOR TO HYGIENIC CHEMICAL COMPANY OF NEW JERSEY, A CORPORATION OF NEW JERSEY.

PROCESS OF TREATING SILICIOUS ORES CONTAINING LITHIA.

No. 847,856.     Specification of Letters Patent.     Patented March 19, 1907.

Application filed May 10, 1906. Serial No. 316,231.

*To all whom it may concern:*

Be it known that I, WALTER ERNEST WADMAN, a subject of the King of Great Britain and Ireland, and a resident of Bayonne, Hudson county, State of New Jersey, have invented certain new and useful Improvements in Processes of Treating Silicious Ores Containing Lithia, of which the following is a specification.

My invention relates to improvements in process for treating ores containing lithia, and more especially to a process of obtaining lithia salts and by-products from the minerals known as "lepidolite," "spodumene," "petalite," and other minerals containing lithia.

Lepidolite is the most abundant source of lithia and is composed of lithia, potash, alumina, and silica, with smaller amounts of less important constituents, the lithia being by far the most valuable constituent and the other constituents diminishing in value in the order above named. The decomposition of these minerals by sulfuric acid is attending with many difficulties and sources of loss. It can only be even partially complete when the mineral is very finely ground. The resulting acidulous solution contains all the alumina, potash, and lithia from the decomposed ore, and the separation of the lithia from the other substances is only accomplished with great difficulty and loss. The alumina must first be partially separated by crystallization as potash alum. The mother-liquor still retains much alumina, which must be removed by precipitation either as hydrate or as a basic salt prior to the recovery of the lithia. In any case the alumina goes down as a bulky precipitate, very difficult to wash and which entangles much lithia, which is lost. All processes depending on the direct decomposition of the ores by sulfuric acid are subject to these sources of loss.

My invention consists in the treatment of the ore in such a manner as to obtain the valuable lithia as a first product in an aqueous solution, free from alumina or other substances that interfere with its complete recovery.

I have found that if the ore be treated with an alkaline sulfate and lightly furnaced the alkali displaces the lithia from its combination with silica, producing a silicate of the alkaline metal and sulfate of lithia, the last being soluble in water, and hence substantially all the lithia of the ore may be extracted in an aqueous solution, uncontaminated with alumina, and in a shape to be converted directly into a merchantable product—*e. g.*, the carbonate of lithia—without loss due to retention in bulky precipitates. For the purpose of rendering the lithia-water soluble, I prefer to use sulfate of potash, because I desire as a later step in the process to recover the alumina and potash already existing in the ore in the form of potash alum.

In the practical operation of my process I find it desirable to use an excess of sulfate of potash over and above that theoretically required to displace the lithia of the ore. Any such excess is not lost or wasted, but, on the contrary, is recovered in a more valuable form, as will hereafter be pointed out. Tolerably finely ground ore is mixed with from two-thirds to an equal weight of crude sulfate of potash and the mixture subjected to gentle ignition in a suitable furnace. The temperature required is not high and far below the fusing-point. The resulting mass is then ground up and lixiviated with hot water, whereby a solution is obtained consisting of practically all the lithia of the ore, together with the excess of sulfate of potash employed. The insoluble residue consists of the alumina and silica of the ore, the potash originally present, and so much of the potash added as was necessary to displace the lithia. The aqueous solution so obtained contains, as aforesaid, sulfates of lithia and potash and practically nothing else except a small amount of manganese. This last is readily removed by the addition of an alkaline hydrate, preferably potassium hydrate, leaving a solution substantially free from everything except the sulfates of potash and lithia. This solution may be either treated directly with a carbonate—*e. g.*, carbonate of potash—whereby lithia carbonate is precipitated, leaving a liquor containing only sulfate of potash, or the aqueous solution may be evaporated and crystallized to obtain the bulk of the potash sulfate in a pure form, leaving lithia sulfate in the mother-liquor to be subsequently precipitated as carbonate. In this way the lithia of the ore is obtained in a pure state and a merchantable form without loss, and the potash sulfate, which is used as a crude article, is recovered in a refined or purified state.

The insoluble residue left after extracting the furnaced product with water, by reason of the treatment it has undergone of gentle ignition with sulfate of alkali and subsequent extraction with water, which forms part of my process, is rendered very much more amenable to treatment with acid, and it can be readily decomposed with sulfuric acid without any further furnacing and entirely in the wet way. This residue is then boiled with a suitable amount of sulfuric acid chemically equivalent to the alumina and potash contained therein, whereby the alumina and potash are dissolved, the resulting solution containing potash alum, which may be crystallized out in the usual way.

It will be seen by my process I obtain, first, the lithia in a water-soluble form and nearly pure and free from admixture with alumina or substances hindering its complete recovery; second, I recover all the potash used in the process and which I use as a crude article in a purified or refined state; third, I recover all or practically all of the alumina and the potash originally present in the ore in the form of potash alum.

The refined sulfate of potash obtained as a by-product in my process may, if desired, be used over and over again in the process; but inasmuch as it is a more valuable article than the crude sulfate I prefer to employ crude sulfate of potash and to dispose of the refined article as such, because in my process the refining is done automatically and without cost.

I claim as my invention—

1. The within-described process of treating ores containing lithia, consisting in heating the ores with alkaline sulfates whereby the lithia is converted into sulfate and rendered soluble in water.

2. The within-described process of treating ores containing lithia, consisting in heating the ores with an alkaline sulfate, whereby the lithia is converted into sulfate and rendered soluble in water, and subsequently converting the lithia sulfate, by suitable reagents, into a commercially marketable salt.

3. The within-described process of treating ores containing lithia, consisting in heating the ores with alkaline sulfates whereby the lithia is converted into sulfate and rendered soluble in water, and after the lithia is extracted, treating the insoluble residue with sulfuric acid whereby potash alum is obtained.

4. The within-described process of treating ores containing lithia, consisting in heating the ores with alkaline sulfates, whereby the lithia is converted into sulfate and rendered soluble in water, then precipitating the lithia from the solution by suitable reagents into a commercially marketable salt, and treating the insoluble residue with sulfuric acid after the extraction of the lithia, whereby potash alum is obtained.

5. The within-described process of treating ores containing lithia, consisting in heating the ores with sulfate of potash whereby the lithia is converted into sulfate and rendered soluble in water, and refined sulfate of potash is obtained as a by-product.

6. The within-described process of treating ores containing lithia, consisting in heating the ores with sulfate of potash whereby the lithia is converted into sulfate and rendered soluble in water, and after the lithia is extracted, treating the insoluble residue with sulfuric acid whereby potash alum is obtained and refined sulfate of potash is obtained as a by-product.

7. The within-described process of treating silicious minerals containing lithia, consisting in heating the ores with alkaline sulfates whereby the lithia contained therein is converted into sulfate and rendered soluble in water.

8. The within-described process of treating silicious minerals containing lithia, consisting in heating the ores with alkaline sulfates whereby the lithia contained therein is converted into sulfate and rendered soluble in water, and after the lithia is extracted, treating the insoluble residue with sulfuric acid whereby potash alum is obtained.

9. The within-described process of treating silicious minerals containing lithia consisting in heating the ores with alkaline sulfate whereby the lithia contained therein is converted into a sulfate, and rendered soluble in water, and subsequently converting the lithia sulfate by suitable reagents into a commercially marketable salt.

10. The within-described process of treating silicious minerals containing lithia consisting in heating the ores with alkaline sulfates whereby the lithia is converted into a sulfate, and rendered soluble in water, and after the lithia is extracted, treating the insoluble residue with sulfuric acid whereby potash alum is obtained and refined sulfate of potash is obtained as a by-product.

11. The within-described process of treating lepidolite containing lithia, consisting in heating the ores with alkaline sulfates whereby the lithia contained therein is converted into sulfate and rendered soluble in water.

12. The within-described process of treating lepidolite containing lithia, consisting in heating the ores with alkaline sulfates whereby the lithia contained therein is converted into sulfate and rendered soluble in water, and after the lithia is extracted, treating the insoluble residue with sulfuric acid whereby potash alum is obtained.

13. The within-described process of treating lepidolite containing lithia consisting in heating the ores with alkaline sulfate whereby the lithia contained therein is converted into a sulfate, and rendered soluble in water, and subsequently converting the lithia sulfate by suitable reagents into a commercially marketable salt.

14. The within-described process of treating lepidolite containing lithia consisting in heating the ores with alkaline sulfates whereby the lithia is converted into a sulfate, and rendered soluble in water, and after the lithia is extracted, treating the insoluble residue with sulfuric acid whereby potash alum is obtained and refined sulfate of potash is obtained as a by-product.

In testimony that I claim the foregoing as my invention I have signed my name, in presence of two witnesses, May, 1906.

WALTER ERNEST WADMAN.

Witnesses:
WALTER P. REGESTEIN,
PETER McGOWAN.